US 6,661,619 B2

(12) United States Patent
Nishida et al.

(10) Patent No.: US 6,661,619 B2
(45) Date of Patent: Dec. 9, 2003

(54) SUSPENSION FOR DISC DRIVE

(75) Inventors: Tatsuhiko Nishida, Aiko-gun (JP); Toshiki Ando, Aiko-gun (JP); Masao Hanya, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 64 days.

(21) Appl. No.: 09/817,461

(22) Filed: Mar. 26, 2001

(65) Prior Publication Data

US 2002/0075605 A1 Jun. 20, 2002

(30) Foreign Application Priority Data

Dec. 15, 2000 (JP) ........................................ 2000-382550

(51) Int. Cl.[7] ............................................. G11B 21/24
(52) U.S. Cl. ................................................... 360/294.4
(58) Field of Search ............................. 360/245–245.9, 360/294–294.9

(56) References Cited

U.S. PATENT DOCUMENTS

| | | | | | |
|---|---|---|---|---|---|
| 4,374,402 | A | * | 2/1983 | Blessom et al. .......... | 360/294.4 |
| 4,991,045 | A | | 2/1991 | Oberg | |
| 5,408,376 | A | * | 4/1995 | Nishikura et al. .......... | 360/109 |
| 5,877,919 | A | * | 3/1999 | Foisy et al. ............... | 360/294.4 |
| 6,108,175 | A | * | 8/2000 | Hawwa et al. ............ | 360/294.4 |
| 6,157,522 | A | * | 12/2000 | Murphy et al. .......... | 360/294.6 |
| 6,188,548 | B1 | * | 2/2001 | Khan et al. ............... | 360/294.4 |
| 6,201,668 | B1 | * | 3/2001 | Murphy .................... | 360/294.4 |
| 6,268,983 | B1 | * | 7/2001 | Imada et al. .............. | 360/294.3 |
| 6,297,936 | B1 | * | 10/2001 | Kant et al. ................ | 360/294.4 |
| 6,310,750 | B1 | * | 10/2001 | Hawwa et al. ........... | 360/294.6 |
| 6,331,923 | B1 | * | 12/2001 | Mei .......................... | 360/294.4 |
| 6,335,848 | B1 | * | 1/2002 | Mei .......................... | 360/294.4 |
| 6,404,600 | B1 | * | 6/2002 | Hawwa et al. ........... | 360/294.4 |
| 6,421,211 | B1 | * | 7/2002 | Hawwa et al. ........... | 360/294.4 |

FOREIGN PATENT DOCUMENTS

| | | |
|---|---|---|
| JP | 60-127578 | 7/1985 |
| JP | 020022150730 A * | 5/2002 |
| JP | 02002197819 A * | 7/2002 |

OTHER PUBLICATIONS

M. Hanya et al, "Suspension Design for Windage and High Bandwidth", (Treatise), Presented on Mar. 27, 2000, Japan.

* cited by examiner

Primary Examiner—Allen Cao
(74) Attorney, Agent, or Firm—Frishauf, Holtz, Goodman & Chick, P.C.

(57) ABSTRACT

A suspension for disc drive comprises a load beam fitted with a flexure, an actuator base including a base plate, a hinge member thinner than the base plate, and a pair of piezoelectric ceramic elements. The piezoelectric ceramic elements displace the distal end portion of the load beam in a sway direction when supplied with voltage. Each piezoelectric ceramic element is stored in an opening portion in the actuator base. A covering material such as an adhesive agent that fills the space between the peripheral edge portion of the piezoelectric ceramic element and the actuator base forms a cover portion that covers the opposite end faces and the opposite side faces of the ceramic element.

14 Claims, 6 Drawing Sheets

SUSPENSION FOR DISC DRIVE

CROSS-REFERENCE TO RELATED APPLICATIONS

This application is based upon and claims the benefit of priority from the prior Japanese Patent Application No. 2000-382550, filed Dec. 15, 2000, the entire contents of which are incorporated herein by reference.

BACKGROUND OF THE INVENTION

The present invention relates to a suspension for disc drive incorporated in an information processing apparatus, such as a personal computer.

In a disc drive that is provided with a rotating magnetic disc or magneto-optical disc, a magnetic head is used to record on or read data from a recording surface of the disc. The magnetic head includes a slider opposed to the recording surface of the disc, a transducer stored in slider, etc. When the disc rotates at high speed, the slider slightly lifts off the disc, whereupon an air bearing is formed between the disc and the slider. A suspension for holding the magnetic head comprises a beam member called a load beam, a flexure formed of a very thin plate spring fixed to the load beam, a base plate provided on the proximal portion of the load beam, etc. The slider that constitutes the magnetic head is mounted on the distal end portion of the flexure.

In a hard disc drive (HDD), the track center of the disc must be subjected to following control within ±10% of the track width. With the recent development of higher-density discs, the track width has been being reduced to 1 μm or less, and it is hard to keep the slider in the track center. It is necessary, therefore, to carry out accurate position control of the slider as well as to increase the stiffness of the disc, thereby reducing the oscillation of the disc.

In general, conventional disc drives are of a single-actuator type such that a suspension is moved by means of a voice coil motor only. The single-actuator suspension has many peaks of resonance in low-frequency bands. Thus, it is hard to control a slider (head portion) on the distal end of the suspension in high-frequency bands by means of the voice coil motor only, and the bandwidth of a servo cannot be enhanced.

Accordingly, a dual-actuator suspension has been developed including a micro-actuator portion as well as a voice coil motor. The distal end portion of a load beam or a slider is slightly moved by a second actuator of the micro-actuator portion in the transverse direction of the suspension (so-called sway direction).

Since the movable portion that is driven by means of the second actuator is considerably lighter in weight than a movable portion of the single-actuator suspension, the slider can be controlled in high-frequency bands. Thus, the dual-actuator suspension, compared with the single-actuator suspension, can make the bandwidth of a servo for the position control of the slider several times higher, and track misses can be reduced correspondingly.

It is known that a piezoelectric ceramic element, such as lead zirconate-titanate (solid solution of $PbZrO_3$ and $PbTiO_3$) called PZT, can be suitably used as the material of the second actuator. Since PZT has a considerably high resonance frequency, it is suited for the second actuator that is used in the dual-actuator suspension.

Piezoelectric ceramic elements such as PZT are fragile and breakable, and besides, contamination that is attributable to the generation of particles from the element surface constitutes a hindrance to practical use. If these particles get into the space between the slider and the disc that is rotating at high speed, the disc and the slider are damaged, so that data recorded on the disc may be broken or a crush may be caused.

The inventors hereof conducted a test for examining the way of generation of particles from a suspension that uses piezoelectric ceramic elements. In this test, the suspension was washed in a liquid by means of an ultrasonic cleaner, and particles not smaller than a given size in a given quantity of liquid were counted. In consequence, it was found that the suspension that uses the piezoelectric ceramic elements produce more particles than a conventional suspension that uses no piezoelectric ceramic elements does.

In the piezoelectric ceramic elements, metal layers for electrodes are formed individually on the obverse and reverse sides by sputtering or plating. Accordingly, there is hardly any possibility of particles being generated from the obverse or reverse side of the element. Since the side or end faces of each piezoelectric ceramic element are cut by means of a dicing machine or the like in a manufacturing process, they are exposed cut surfaces. These cut surfaces form sources of particles, so that particles continue to be generated every time the suspension is cleaned.

BRIEF SUMMARY OF THE INVENTION

Accordingly, the object of the present invention is to provide a suspension for disc drive with a micro-actuator portion capable of restraining generation of particles.

In order to achieve the above object, a suspension of the present invention comprises a load beam provided with a flexure, an actuator base provided on the proximal portion of the load beam, a piezoelectric ceramic element mounted on the actuator base and adapted to be distorted to displace the load beam in a sway direction when voltage is applied thereto, and a cover portion formed of a covering material filling the space between the peripheral edge portion of the piezoelectric ceramic element and the actuator base and covering the longitudinally opposite end faces and side faces of the piezoelectric ceramic element. The covering material may be a synthetic resin or metal that can be fixed to the piezoelectric ceramic element, including an adhesive agent, for example. According to this invention, the cover portion can restrain generation of particles from the element. Since the cover portion cannot substantially hinder the displacement of the piezoelectric ceramic element, it never causes the stroke of the element to deteriorate.

In the suspension of the invention, the actuator base may be formed having an opening portion capable of holding the piezoelectric ceramic element, the opening portion holding the piezoelectric ceramic element. Since the piezoelectric ceramic element is held in the opening portion of the actuator base, according to this invention, a sufficient quantity of covering material can be easily applied on the end and side faces of the element, and the covering material can be prevented from running down before it is cured. Thus, the resulting cover portion can be thick enough.

In the suspension of the invention, moreover, the load beam and the actuator base may be connected to each other by means of an independent flexible hinge member. According to this invention, materials that meet required properties of the load beam, actuator base, and hinge member can be used, so that the properties of the suspension can be improved.

In the suspension of the invention, an extending portion extending along a side face of the piezoelectric ceramic element may be provided on a part of the hinge member, and the cover portion may be formed along the extending portion. According to this invention, a covering material such as an adhesive agent can be easily supplied along the extending portion on the hinge member and can be prevented from running down, so that the resulting cover portion can be thick enough.

In the suspension of the invention, the covering material may be an adhesive agent with uncured-state viscosity ranging from 2 PaS to 1,000 Pas. According to this invention, the adhesive agent for the formation of the cover portion may be applied thick on the piezoelectric ceramic element and has moderate fluidity, so that it enjoys good applicability.

In the suspension of the invention, furthermore, the covering material for forming the cover portion may be formed of the same adhesive agent that is used to fix the piezoelectric ceramic element to the actuator base. According to this invention, a common adhesive material can be used for the adhesive agent for fixing the piezoelectric ceramic element to the actuator base and the adhesive agent for forming the cover portion, so that the adhesive agent can be handled with ease, and working properties for applying the adhesive are improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A suspension 10A for disc drive according to a first embodiment of the present invention will now be described with reference to FIGS. 1 to 4.

Figure 1:
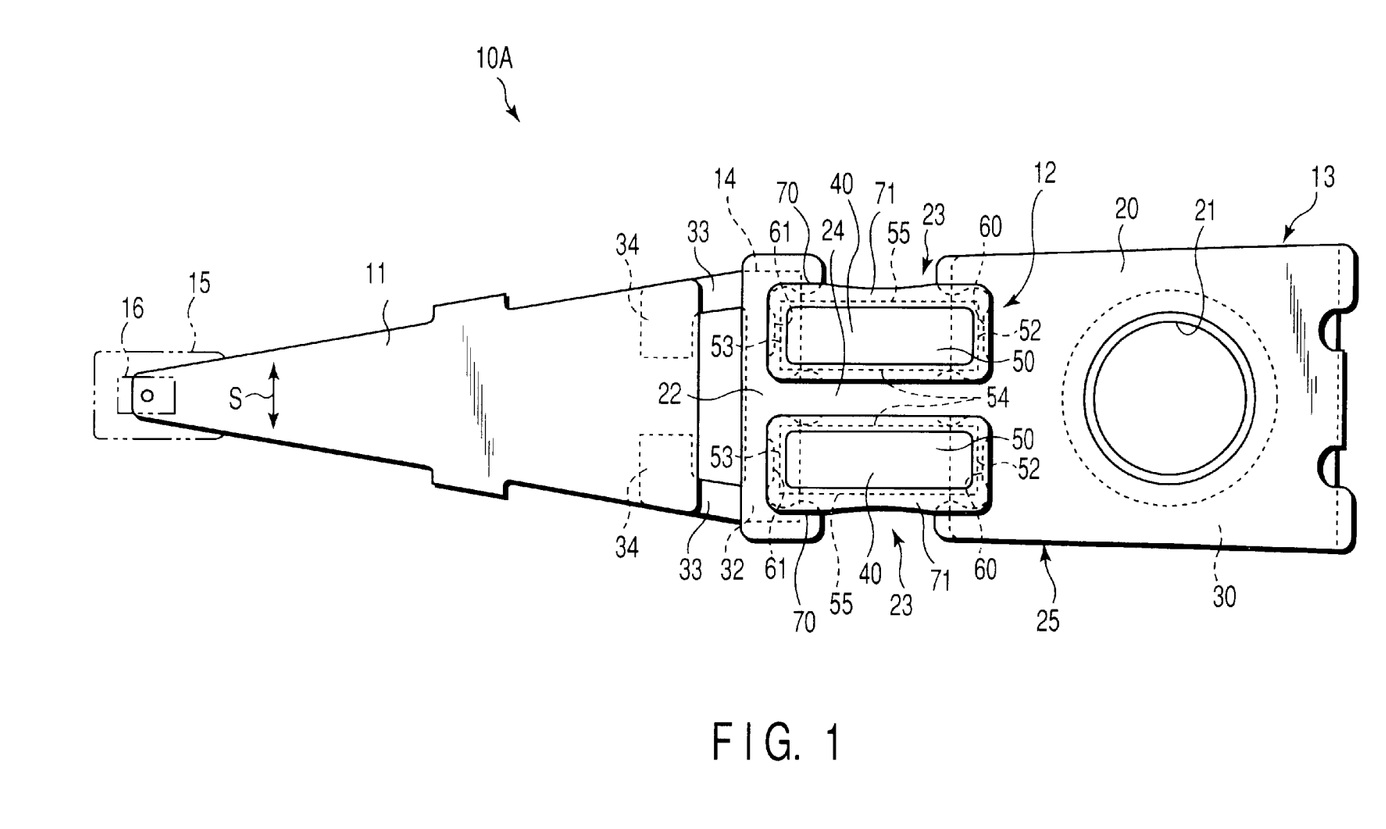
FIG. 1 is a plan view of a suspension according to a first embodiment of the present invention.

The suspension 10A of a dual-actuator type shown in FIG. 1 comprises a load beam 11, micro-actuator portion 12, base plate 13, hinge member 14, etc. The load beam 11 is formed of a springy metal plate with a thickness of, e.g., about 100 $\mu$m. A flexure 15 is mounted on the load beam 11. The flexure 15 is formed of a thin, metal precision plate spring that is thinner than the load beam 11. A slider 16 that constitutes a magnetic head is provided on the distal end portion of the flexure 15.

Figure 2:
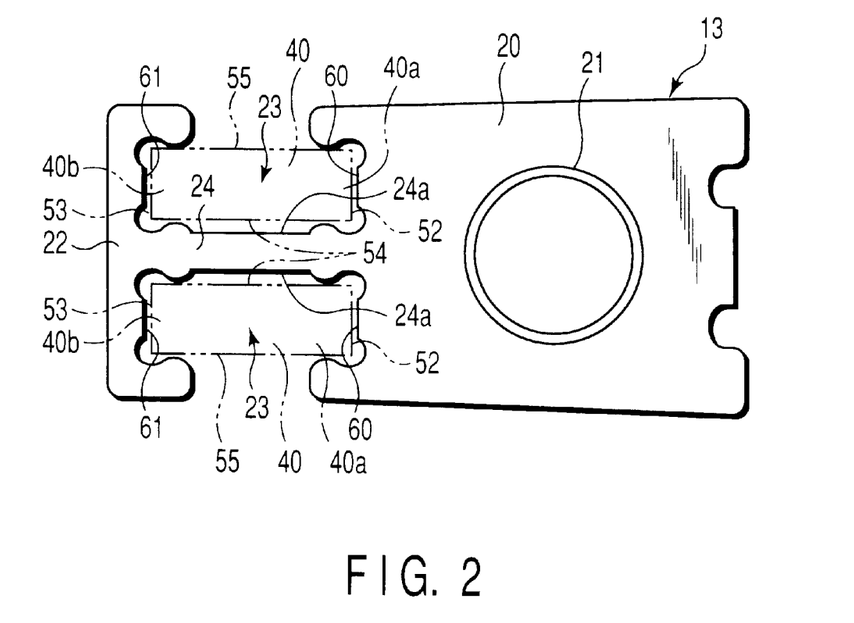
FIG. 2 is a plan view of a base plate of the suspension shown in FIG. 1.

As shown in FIG. 2, a circular boss hole 21 is formed in a proximal portion 20 of the base plate 13. A pair of opening portions 23 are formed between the proximal portion 20 and a front end portion 22 of the base plate 13. Each opening portion 23 is large enough to hold a piezoelectric ceramic element 40. A strip-shaped connecting portion 24 extends in the longitudinal direction of the base plate 13 (axial direction of the suspension 10A) between the paired opening portions 23. The connecting portion 24 can bend to a certain degree in the transverse direction of the base plate 13 (sway direction indicated by arrow S in FIG. 1).

The proximal portion 20 of the base plate 13 is fixed to the distal end portion of an actuator arm that is driven by means of a voice coil motor (not shown), and is turned by means of the voice coil motor. The base plate 13 is formed of a metal plate with a thickness of, e.g., about 200 $\mu$m. In the case of this embodiment, the base plate 13 and the hinge member 14 constitute an actuator base 25 according to the present invention.

Figure 3:
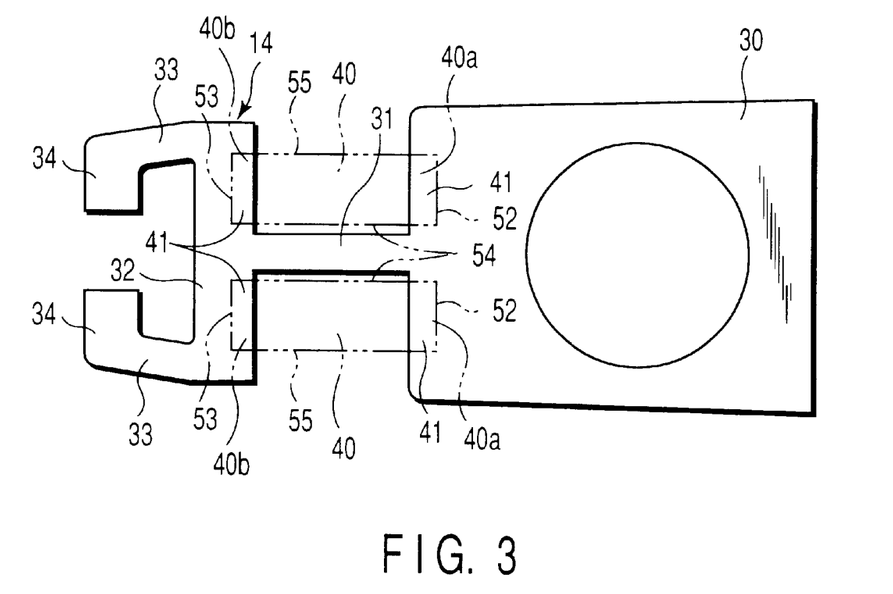
FIG. 3 is a plan view of a hinge member of the suspension shown in FIG. 1.

As shown in FIG. 3, the hinge member 14 includes a proximal portion 30 fixedly superposed on the proximal portion 20 of the base plate 13, a strip-shaped bridge portion 31 formed corresponding in position to the connecting portion 24 of the base plate 13, intermediate portion 32 formed corresponding in position to the front end portion 22 of the base plate 13, a pair of flexible hinge portions 33 capable of elastic deformation in the thickness direction, a distal end portion 34 fixed to the load beam 11, etc. The hinge member 14 is formed of a springy metal plate with a thickness of, e.g., about 40 $\mu$m.

Figure 4:
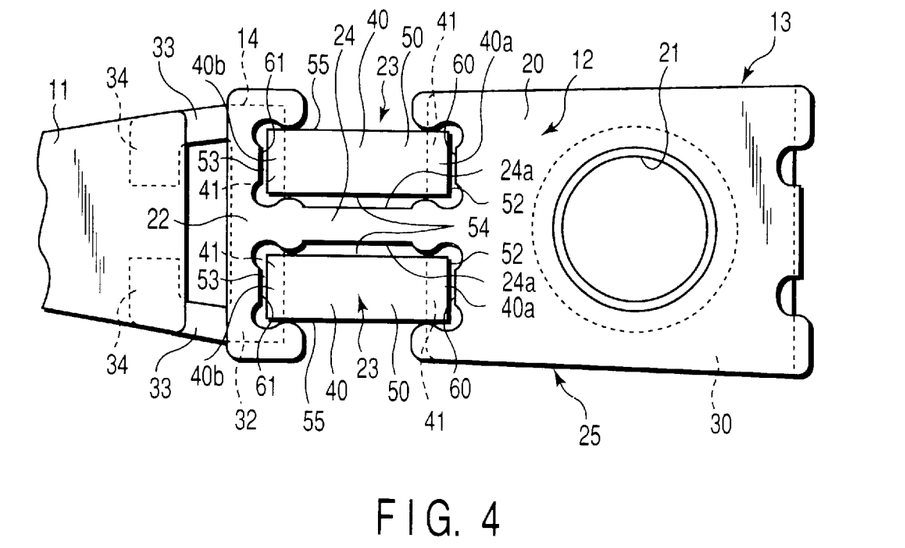
FIG. 4 is a plan view of the suspension of FIG. 1 in a state before the formation of cover portions.

The micro-actuator portion 12 includes a pair of piezoelectric ceramic elements 40 comprising platelike piezoelectric elements such as PZTs. As shown in FIG. 4, these piezoelectric ceramic elements 40 are stored individually in the opening portions 23 of the actuator base 25 so as to extend substantially parallel to each other.

In the case of this embodiment, one end portion 40a of each element 40 in its corresponding opening portion 23 is fixed to the proximal portion 30 of the hinge member 14 with an adhesive agent 41. The other end portion 40b of the element 40 is fixed to the intermediate portion 32 of the hinge member 14 with the adhesive agent 41. The adhesive agent 41 should be also loaded into the spaces between the element 40 and inner surfaces 60 and 61 of each opening portion 23 of the actuator base 25. This should be done in order to transmit distortion (displacement) of each element 40 more effectively to the load beam 11 and fully to secure electrical insulation between the actuator base 25 the end faces 52 and 53 and side faces 54 and 55 of the element 40.

When voltage is applied, one of the piezoelectric ceramic elements 40 extends in the longitudinal direction, while the other element 40 contracts in the longitudinal direction. Thus, the load beam 11 is displaced for a desired distance in the transverse direction (sway direction) in accordance with the direction and stroke of the distortion of the piezoelectric ceramic elements 40.

Each piezoelectric ceramic element 40, in the form of a rectangular plate, has an obverse side 50 and a reverse side in the thickness direction, end faces 52 and 53 at the opposite ends in the longitudinal direction, and opposite side faces 54 and 55. Electrodes (not shown) of a conductive material such as metal are formed all over the obverse side 50 and the reverse side, individually, by sputtering or plating. The end faces 52 and 53 and the side faces 54 and 55 are cut surfaces that are cut by means of a dicing machine or the like during the manufacture of the element 40.

The opposite end faces 52 and 53 of each element 40 face the inner surfaces 60 and 61, respectively, at the longitudinally opposite ends of each opening portion 23 of the actuator base 25 when the element 40 is fitted in the opening portion 23. The side face 54 of each element 40 nearer to the connecting portion 24, out of the opposite side faces 54 and 55, faces a side face 24a of the connecting portion 24.

As shown in FIG. 1, the end faces 52 and 53 and the side faces 54 and 55 of each element 40 are covered with a cover portion 71 that is formed of an adhesive agent 70 as an example of a covering material. More specifically, the spaces between the opposite end faces 52 and 53 of each element 40 and the inner surfaces 60 and 61 of each corresponding opening portion 23 are filled with the adhesive agent 70, and the space between the one side face 54 of the element 40 and each corresponding side face 24a of the connecting portion 24 is filled with the adhesive agent 70. The cover portion 71 formed of the adhesive agent 70 covers the end faces 52 and 53 and the side faces 54 and 55 of each element 40. By loading the adhesive agent 70 in this manner, a shortage of the adhesive agent 41 between each element 40 and the inner surfaces 60 and 61 of each opening portion 23 of the actuator base 25 can be replenished.

Preferably, the viscosity of the uncured adhesive agent 70 for the cover portion 71 ranges from 2 Pas to 1,000 Pas. If the viscosity is less than 2 Pas, the adhesive agent 70 spreads too thin to form the cover portion 71 with a satisfactory thickness. If the cover portion 71 is not thick enough, the adhesive agent 70 may be destroyed and cause generation of particles when ultrasonic cleaning is carried out. If the viscosity exceeds 1,000 Pas, the fluidity of the adhesive agent 70 lowers, so that it is hard to apply the agent 70 to a production line that is provided with ordinary adhesive supply nozzles.

Tests were conducted for Samples 1, 2 and 3 to see how the stroke of each piezoelectric ceramic element 40 changes if the element 40 is provided with the cover portion 71. In consequence, strokes of Sample 1 before and after the formation of the cover portion 71 were ±1.200 μm and ±1.168 μm, respectively, which indicate a stroke reduction of 0.032 μm. Strokes of Sample 2 before and after the formation of the cover portion 71 were ±1.232 μm and ±1.200 μm, respectively, which indicate a stroke reduction of 0.032 μm. Strokes of Sample 3 before and after the formation of the cover portion 71 were ±1.200 μm and ±1.208 μm, respectively. Thus, it was confirmed that none of Samples 1, 2 and 3 underwent any practically significant deterioration in stroke.

Figure 5:
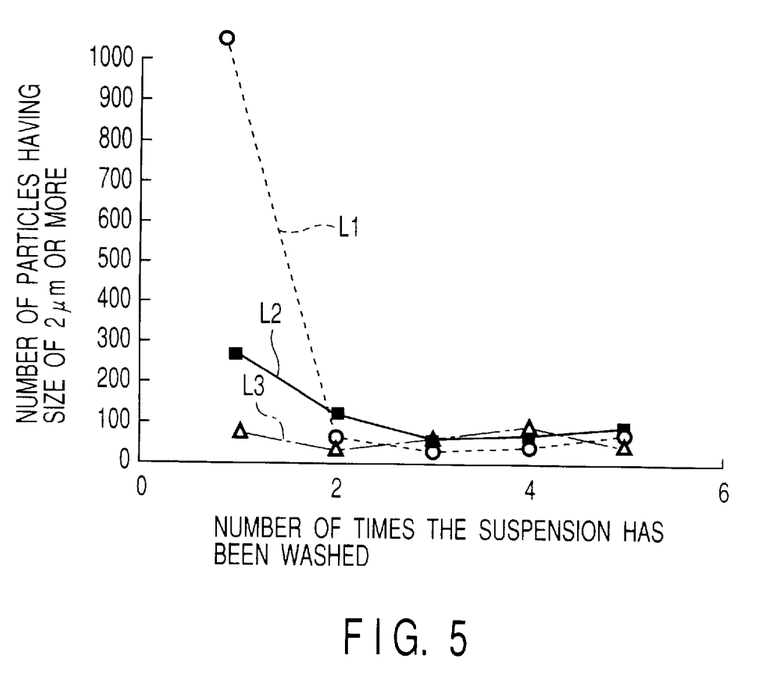
FIG. 5 is a diagram showing the numbers of particles generated when the suspension shown in FIG. 1 and a suspension without piezoelectric ceramic elements are subjected to ultrasonic cleaning, individually.

The suspension 10A provided with the piezoelectric ceramic elements 40 described above was subjected to ultrasonic cleaning and to a test for counting particles in a liquid. FIG. 5 shows the result of the test. In FIG. 5, measured values L1 and L2 represent the numbers of particles of the suspension A that is provided with the piezoelectric ceramic elements 40. A measured value L3 represents the number of particles of the conventional suspension that is not provided with any piezoelectric ceramic elements.

After the suspension 10A of the foregoing embodiment was washed twice, the number of particles was reduced to the same level reached when the suspension with no piezoelectric ceramic elements was washed twice, as shown in FIG. 5. Thus, it was confirmed that the suspension 10A of the foregoing embodiment was able to avoid generating particles from the piezoelectric ceramic elements.

Figure 6:
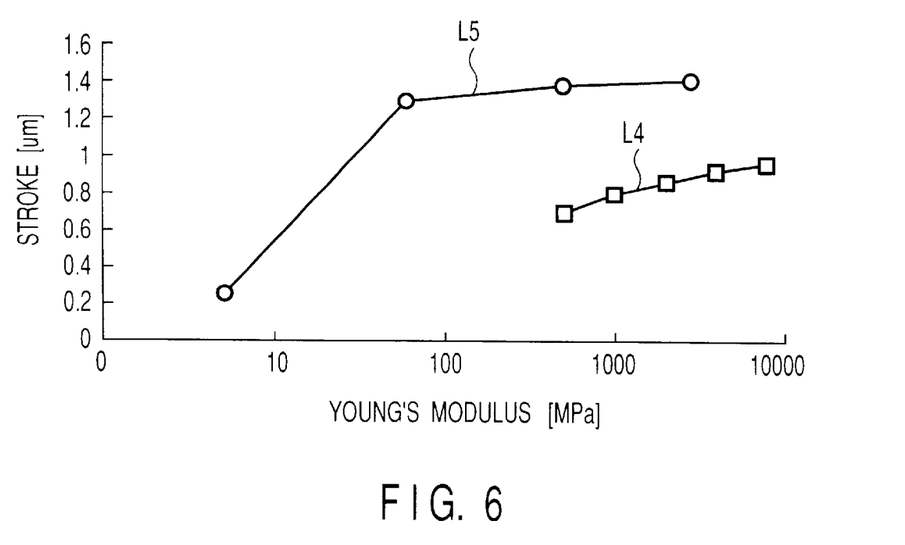
FIG. 6 is a diagram showing the relationship between the stroke of piezoelectric ceramic elements and the Young's modulus of an adhesive agent for fixing the piezoelectric ceramic elements to an actuator base.

FIG. 6 shows the relationship between the stroke and the Young's modulus of the adhesive agent used to fix the piezoelectric ceramic elements 40 to the actuator base 25. In FIG. 6, L4 and L5 represent an analytic value and a measured value, respectively. It is indicated that the adhesive agent for fixing the elements 40 to the actuator base 25 can secure the stroke of the elements 40 more favorably if its Young's modulus is higher.

As for the adhesive agent 70 for forming the cover portions 71, on the other hand, it is believed to be able to retard the stroke of the elements 40 less easily if its Young's modulus is lower. However, a study made by the inventors hereof indicates that the Young's modulus of the adhesive agent 70 used for the cover portions 71 is low enough compaired with metal, so that the adhesive agent 70 does not prevent the distortion of the connecting portion 24 which is located in central region of the actuator portion 12. In other words, a common adhesive material (adhesive agent with high Young's modulus) can be used for the adhesive agent for fixing the elements 40 to the actuator base 25 and the adhesive agent 70 for forming the cover portions 71.

Figure 7:
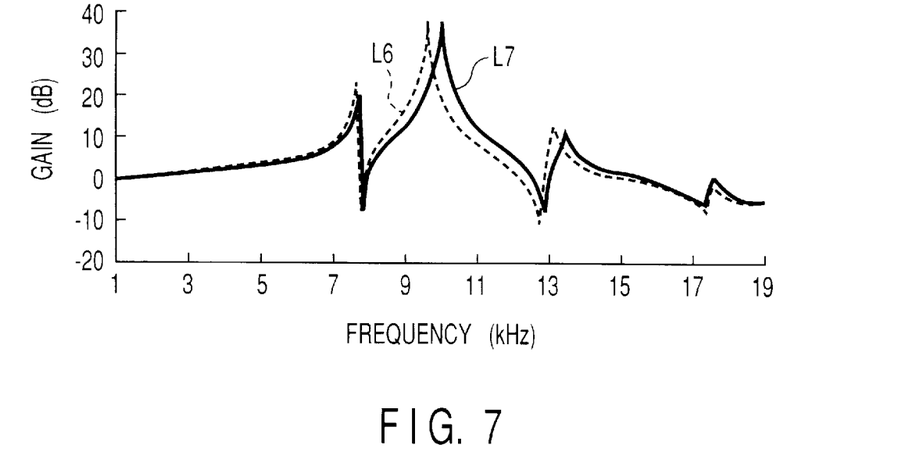
FIG. 7 is a diagram showing the relationship between the frequency and gain of the suspension before and after the formation of the cover portions.

FIG. 7 shows the result of measurement of movements of the suspension in the sway direction. In FIG. 7, a curved line L6 represents the result of measurement of a movement in the sway direction before the formation of the cover portions 71. A curved line L7 represents the result of measurement of a movement in the sway direction after the formation of the cover portions 71. In the suspension having the cover portions 71 formed thereon, the micro-actuator portion 12 is reinforced with the cover portions 71. When compared with the case of the suspension without the cover portions 71, thereof, the sway frequency is shifted to a higher zone, so that the properties are improved. Since the cover portions 71 can protect the elements 40, moreover, the breaking strength of the elements 40 can be enhanced.

Figure 8:
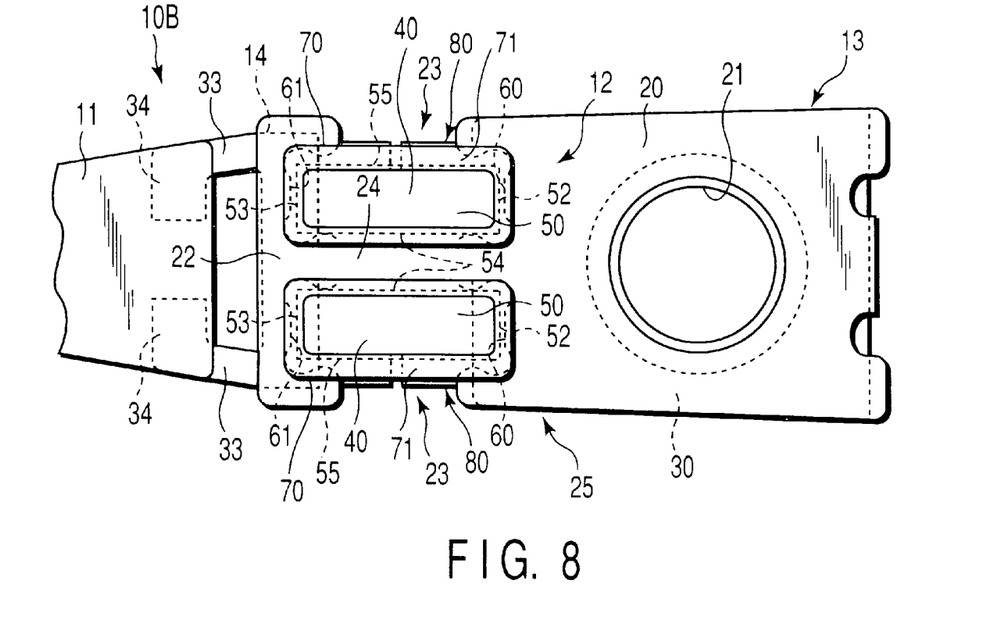
FIG. 8 is a plan view of a part of a suspension according to a second embodiment of the invention.
Figure 9:
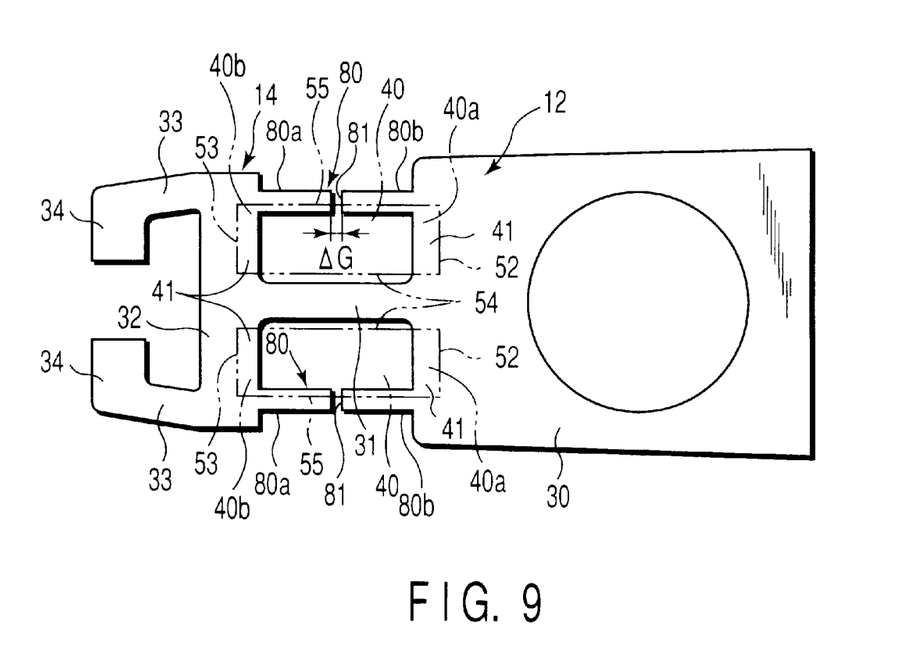
FIG. 9 is a plan view of a hinge member of the suspension shown in FIG. 8.
Figure 10:
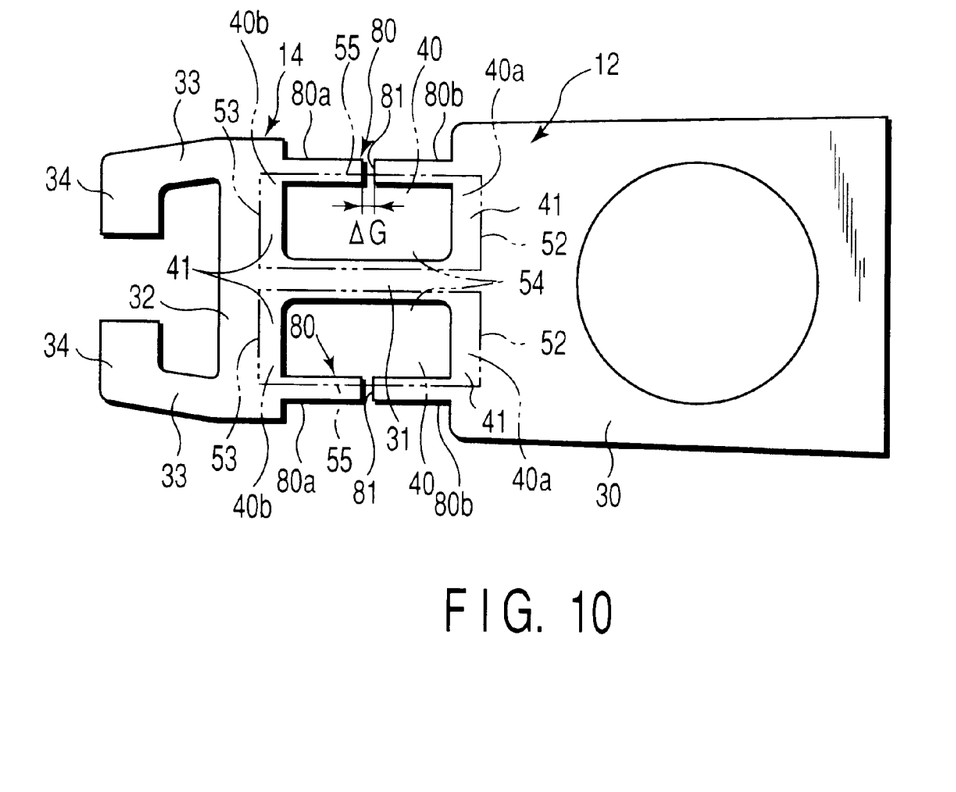
FIG. 10 is a plan view of a micro-actuator portion of a suspension according to a third embodiment of the invention.

In the case of the suspension 10A as is shown in FIG. 4, the one side face 55 of each element 40 faces a space that is free of the actuator base 25. Accordingly, the adhesive agent 70 applied on the side face 55 easily runs down and lacks in thickness. A suspension 10B according to a second embodiment of the present invention shown in FIGS. 8 and 9 is an effective measure to counter this situation. Alternatively, an micro-actuator portion 12 according to a third embodiment of the present invention shown in FIG. 10 is also effective measure to counter that situation. Each case of the micro-actuator portion 12 of those suspensions, strip-shaped extending portions 80 that extend along a side face 55 of each of elements 40 are formed on parts of a hinge member 14. Each of extending portion 80 includes a first portion 80a and second portion 80b that faces the first portion 80a. Formed between each two opposite portions 80a and 80b is a gap 81 that facilitates movement in the sway direction. As the adhesive agent 70 is applied along the extending portions 80, the side face 55 of each element 40 is covered with a cover portion 71. The second and third embodiments share other configurations and functions with the suspension 10A of the first embodiment. Therefore, common reference numerals are used to designate common portions of the three embodiments, and a description of those portions is omitted.

Each of micro-actuator portion 12 of the second and third embodiments, the adhesive agent 70 can be supplied along the side face 55 of each element 40 and the extending portions 80. Since the extending portions 80 serve to prevent the adhesive agent 70 from running down, the adhesive agent 70 on the side face 55 can avoid lacking in thickness, and the cover portion 71 with an enough thickness can be formed covering the whole circumference of each element 40.

In the micro-actuator portion 12 shown in FIG. 9, the side 55 of each element 40 overlaps the extending portion 80. In the micro-actuator portion 12 depicted in FIG. 10, the sides 54 and 55 of each element 40 overlaps the bridge portion 31 and the extending portion 80, respectively.

The inventors of the present invention conducted an experiment to determine how the stroke of the element 40 is in various types of micro-actuator portion. Some of the micro-actuator portions had a gap 81 having a width ΔG of 0.1 mm, some other micro-actuator portions had a gap 81 having a width ΔG of 0.3 mm, and the remaining micro-actuator portions had no gaps 81. Further, the side 55 of each element 40 overlapped the extending portion 80 in some of the micro-actuator portions, and did not overlap the extending portion 80 in the remaining micro-actuator portions.

In the micro-actuator portions having no gaps 81, the stroke each element 40 had before coated with adhesive agent 70 was approximately half the stroke each element 40 had in the micro-actuator portions having no extending portion 80. In the micro-actuator portions having gaps 81, the stroke of each element 40 decreased about 20% after the element 40 was coated with adhesive agent 70. No difference in stroke was observed between any element 40 whose side 55 overlapped the extending portion 80 and any element 40 whose side 55 did not overlap the extending portion 80. Thus, to facilitate the process of coating the element 40 with the adhesive agent 70, it is desired that the micro-actuator portion should have an extending portion 80, the side 55 should overlap the portion 80, and the micro-actuator portion should have a gap 81 having a width ΔG ranging from 0.1 to 0.3 mm, preferably about 0.1 mm.

In each of the foregoing embodiments, the piezoelectric ceramic elements 40 are held in the opening portions 23 in the actuator base 25. Instead of holding the elements 40 in the opening portions 23, however, the elements 40 may be fixedly superposed on the actuator base 25.

It is to be understood, in carrying out the present invention including the embodiments described herein, that the components that constitute the invention, including the load beam, base plate, hinge member, actuator base, piezoelectric ceramic elements, covering materials, etc., may be variously changed or modified without departing from the scope or spirit of the invention. For lighter weight, the base plate and the load beam may be formed of a light metal alloy, such as aluminum alloy, or a laminate (e.g., cladding) of a light metal alloy and stainless steel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:
   a load beam provided with a flexure;
   an actuator base provided on the proximal portion of the load beam;
   a piezoelectric ceramic element mounted on the actuator base and adapted to be distorted to displace the load beam when voltage is applied thereto; and
   a cover portion formed of a covering material filling a space between a peripheral edge portion of the piezoelectric ceramic element and the actuator base, said cover portion being applied over an entire circumference of the piezoelectric ceramic element so as to entirely cover longitudinally opposite end faces and side faces of the piezoelectric ceramic element, including cut surfaces of the piezoelectric ceramic element, thereby preventing generation of particles from the end faces and side faces of the piezoelectric ceramic element.

2. A suspension for disc drive according to claim 1, wherein said actuator base is formed having an opening portion capable of holding the piezoelectric ceramic element, and the opening portion holds the piezoelectric ceramic element.

3. A suspension for disc drive according to claim 1, wherein said load beam and said actuator base are connected to each other by a flexible hinge member.

4. A suspension for disc drive according to claim 2, wherein said load beam and said actuator base are connected to each other by a flexible hinge member.

5. A suspension for disc drive according to claim 2, wherein an extending portion extending along one of said side faces of the piezoelectric ceramic element is provided on a part of the hinge member, and said cover portion is formed along the extending portion.

6. A suspension for disc drive according to claim 5, wherein said extending portion includes a first portion, a second portion that faces the first portion, and a gap formed between the first and second portions.

7. A suspension for disc drive according to claim 2, wherein said covering material is an adhesive agent with an uncured-state viscosity ranging from 2 Pas to 1,000 Pas.

8. A suspension for disc drive according to claim 3, wherein said covering material is an adhesive agent with an uncured-state viscosity ranging from 2 Pas to 1,000 Pas.

9. A suspension for disc drive according to claim 4, wherein said covering material is an adhesive agent with an uncured-state viscosity ranging from 2 Pas to 1,000 Pas.

10. A suspension for disc drive according to claim 6, wherein said covering material is an adhesive agent with an uncured-state viscosity ranging from 2 Pas to 1,000 Pas.

11. A suspension for disc drive according to claim 2, wherein said covering material forming the cover portion comprises a same adhesive agent that is used to fix the piezoelectric ceramic element to the actuator base.

12. A suspension for disc drive according to claim 3, wherein said covering material forming the cover portion comprises a same adhesive agent that is used to fix the piezoelectric ceramic element to the actuator base.

13. A suspension for disc drive according to claim 4, wherein said covering material forming the cover portion comprises a same adhesive agent that is used to fix the piezoelectric ceramic element to the actuator base.

14. A suspension for disc drive according to claim 6, wherein said covering material forming the cover portion comprises a same adhesive agent that is used to fix the piezoelectric ceramic element to the actuator base.

* * * * *